United States Patent
Ho et al.

(10) Patent No.: US 10,606,244 B2
(45) Date of Patent: Mar. 31, 2020

(54) METHOD OF INWARDLY DECREASING COLORING CONTOUR OF COLOR 3D OBJECT

(71) Applicants: XYZPRINTING, INC., New Taipei (TW); KINPO ELECTRONICS, INC., New Taipei (TW)

(72) Inventors: Kwan Ho, New Taipei (TW); Kuo-Yen Yuan, New Taipei (TW); Ko-Wei Shih, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 0 days.

(21) Appl. No.: 15/832,123

(22) Filed: Dec. 5, 2017

(65) Prior Publication Data
US 2018/0307208 A1    Oct. 25, 2018

(30) Foreign Application Priority Data
Apr. 20, 2017    (TW) .............................. 106113241 A (51) Int. Cl.
*G05B 19/40*    (2006.01)
*G05B 19/4099*    (2006.01)
(Continued)

(52) U.S. Cl.
CPC ........ *G05B 19/4099* (2013.01); *B29C 64/386* (2017.08); *B33Y 50/00* (2014.12); *H04N 1/4092* (2013.01); *B29K 2995/0021* (2013.01)

(58) Field of Classification Search
CPC combination set(s) only.
See application file for complete search history.

(56) References Cited

U.S. PATENT DOCUMENTS 8,643,898 B2    2/2014  Koyama et al.
2002/0167101 A1  11/2002  Tochimoto et al.
(Continued)

FOREIGN PATENT DOCUMENTS

EP    3147105 A1    3/2017
WO    2015178443 A1    11/2015

OTHER PUBLICATIONS

Alan Brunton et al: "Puching the Limits of 3D Color Printing", ACM Transactions on Graphics (TOG), vol. 35, No. 1, Dec. 1, 2015, pp. 1-13, XP055366828, US ISSN: 0730-0301, DOI: 10.1145/2832905 *Section 4, "Overview" / "layer construction". *.
(Continued)

*Primary Examiner* — Barbara D Reinier
(74) *Attorney, Agent, or Firm* — Chun-Ming Shih; HDLS IPR Services (57) ABSTRACT

A method of inwardly decreasing a coloring contour of a color 3D object includes: performing an object-slicing on a 3D object to generate records of object print-route information of printing layers; performing an image-slicing on the 3D object to generate records of color-printing information of the printing layers, wherein each color-printing information respectively involves an original coloring contour (3) of each printing layer; performing an inward decrease on the records of color-printing information to generate records of updated color-printing information, wherein each updated color-printing information involves an inwardly decreased coloring contour (4) of each printing layer, and the inwardly decreased coloring contour (4) is spaced from the original coloring contour (3) by an inwardly decreased distance (D); and causing a storage to store the records of object print-route information as route files, and storing the records of updated color-printing information as image files.

16 Claims, 10 Drawing Sheets

(51) Int. Cl.
*B29C 64/386* (2017.01)
*H04N 1/409* (2006.01)
*B33Y 50/00* (2015.01)

(56) References Cited

U.S. PATENT DOCUMENTS

| | | | |
|---|---|---|---|
| 2012/0255663 A1* | 10/2012 | Holroyd | B29C 65/002 |
| | | | 156/64 |
| 2014/0257549 A1 | 9/2014 | Swartz et al. | |
| 2015/0190967 A1* | 7/2015 | Stava | B29C 67/0088 |
| | | | 427/256 |
| 2015/0321425 A1 | 11/2015 | Stava | |
| 2016/0151980 A1 | 6/2016 | Hatanaka | |

OTHER PUBLICATIONS

Search Report dated Jul. 11, 2018 of the corresponding European patent application.

* cited by examiner

METHOD OF INWARDLY DECREASING COLORING CONTOUR OF COLOR 3D OBJECT

BACKGROUND OF THE INVENTION

Technical Field

The technical field relates to color 3D (three-dimensional) objects, and more particularly relates to a method of inwardly decreasing the coloring contour of a color 3D object.

Description of Related Art

Due to the maturity in the development of 3D printing technology and also the narrower size and lower price of current 3D printers, 3D printers are growing and becoming popular very quickly in recent years. Additionally, to make the printed 3D models more acceptable to the users, parts of the manufacturers have brought new types of 3D printers to the market that can print full-color 3D models.

However, in related art, the 3D printers mentioned above directly jet the material on the contour of a color 3D model. Ink jetted on the contour of the color 3D model may be damaged if the contour of the color 3D model is worn or contacts water. Further, the appearance of the colored 3D model will be seriously affected.

Thus, the need for improvement still exists.

SUMMARY OF THE INVENTION

The disclosure is directed to a method of inwardly decreasing coloring contour of color 3D object for inwardly moving the coloring contour of a 3D model so that the finished 3D model has an aesthetically pleasing appearance.

In one disclosed example of the disclosure, a method of inwardly decreasing coloring contour of a color 3D comprising the steps of: sending a 3D object to a processor; performing an object slicing on the 3D object to generate records of object print route information of printing layers; performing an image slicing on the 3D object to generate records of color printing information of the printing layers, wherein each color printing information involves an original coloring contour of each printing layer; performing an inward decrease on the records of color printing information to generate records of updated color printing information, wherein each updated color printing information involves an inwardly decreased coloring contour of each printing layer, and the inwardly decreased coloring contour is spaced from the original coloring contour by an inwardly decreased distance; and causing a storage to store the records of object print route information as route files, and storing the records to updated color printing information as image files.

Therefore, in printing, a 3D printer may control a 3D print head based on a plurality of records of print route information to sequentially print a slicing object of a plurality of printing layers, and control a 2D print head based on a plurality of records of updated color printing information to color the slicing object of each printing layer.

In comparing with the conventional color printing technologies, the embodiments of the invention can inwardly decrease coloring contour of the 3D model. Therefore, it can eliminate drawbacks including ink jetted on the contour of the color 3D model being damaged if the contour of the color 3D model is worn or contacts water, and the appearance of the colored 3D model being seriously affected associated with the conventional 3D printing technologies.

The above and other objects, features and advantages of the invention will become apparent from the following detailed description taken with the accompanying drawings.

DETAILED DESCRIPTION OF THE INVENTION

Embodiments of the invention will now be described, by way of example only, with reference to the accompanying drawings.

The invention is directed to a method of inwardly decreasing coloring contour of color 3D (called the "method"). The method is tied to a 3D printer having a print head for squeezing out materials and another print head for propelling droplets of color ink so as to print a color 3D model.

Figure 1:
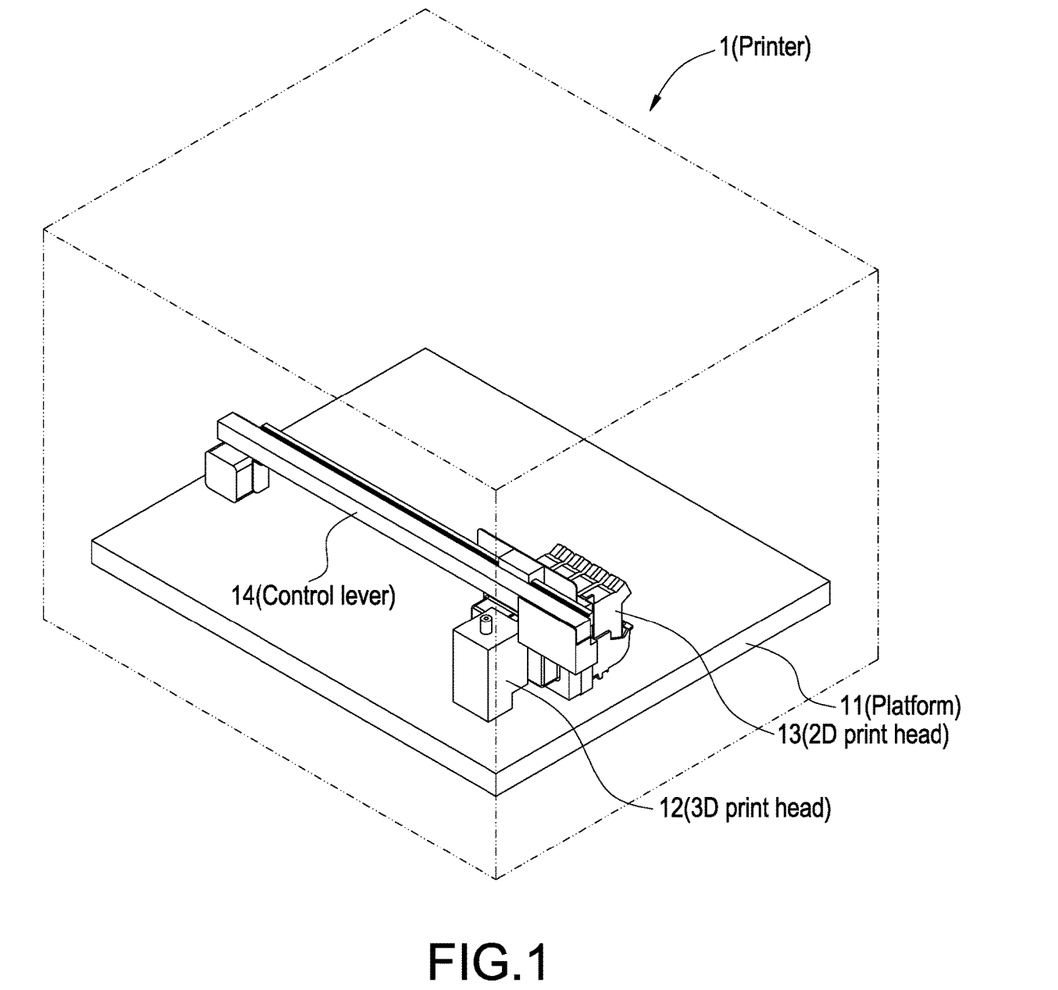
FIG. 1 is a perspective view of a 3D printer according to an embodiment of the invention.

Referring to FIG. 1, a perspective view of a 3D printer according to a disclosed embodiment of the invention is shown. The 3D printer, as shown in FIG. 1, is labeled by 1 (called the "printer"). The printer 1 includes a platform 11, a 3D print head 12 for squeezing out materials so as to print a 3D model, and a 2D (two-dimensional) print head 13 for propelling droplets of different color inks so as to color the 3D model.

In the disclosed embodiment, the 2D print head 13 is an ink jet print head for conventional 2D ink jet printer. The 2D print head 13 is provided with a plurality of ink cartridges of different colors. In an embodiment, the 2D print head 13 is provided with cyan, magenta, yellow and black ink cartridges. Thus, the 2D print head 13 is capable of coloring a 3D model printed by the 3D print head 12. As a result, a color 3D model is rendered.

In the embodiment of FIG. 1, the printer 1 is implemented as a fused deposition model (FDM) type 3D printer, and the materials adopted by the 3D print head 12 are thermoplastic filaments. Specifically, in an embodiment, the materials adopted by the 3D print head 12 are light transmissive thermoplastic filaments. More specifically, in another embodiment, the materials adopted by the 3D print head 12 are translucent thermoplastic filaments or transparent thermoplastic filaments. In the disclosed example, even if the 2D print head 13 does not propel droplets of ink onto the contour of a 3D model in coloring operation, a user still can see the color of the ink permeated within the 3D model due to the nature of the transparency of the materials adopted by the 3D print head 12.

In the embodiment of FIG. 1, both the 3D print head 12 and the 2D print head 13 are disposed on a control lever 14 which is controlled by the printer 1 to move the 3D print head 12 and the 2D print head 13 respectively. In other embodiments, several control levers are provided and each control lever is adapted to control the movements of the 3D print head 12 and the 2D print head 13 respectively.

With respect to a printing operation of the printer 1, the 3D print head 12 prints a slicing object of each printing layer of a 3D object on the platform 11, and the 2D print head 13 colors each slicing object which has been printed.

Figure 2:
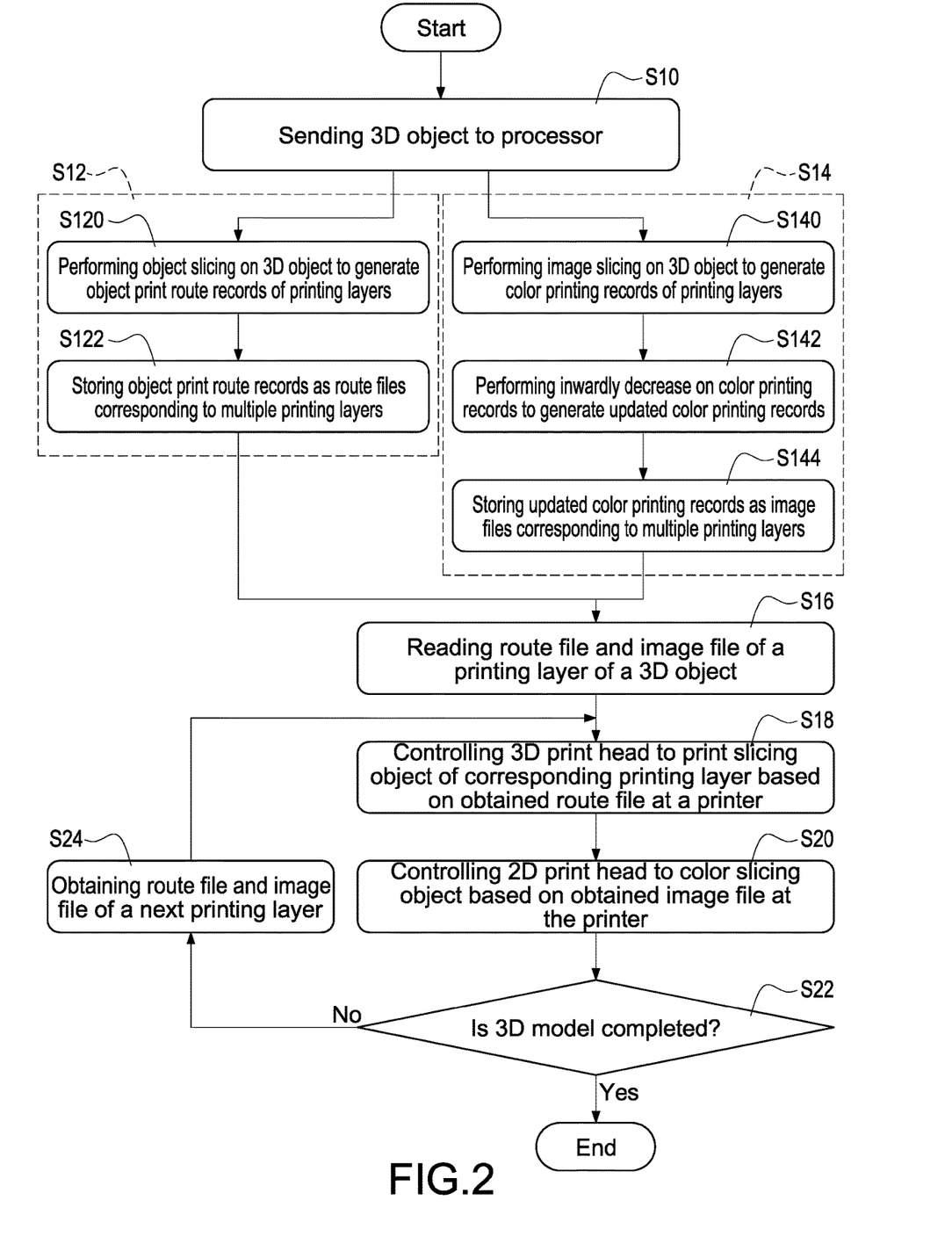
FIG. 2 is a flow chart illustrating slicing and printing steps according to a method of inwardly decreasing coloring contour of color 3D object of an embodiment of the invention.

Referring to FIG. 2, it is a flow chart illustrating slicing and printing steps according to a method of inwardly decreasing coloring contour of color 3D object of an embodiment of the invention. Specifically, in FIG. 2 it discloses steps of printing a 3D object by a processor of the printer 1 or a processor of a computer (not shown) connected to the printer 1. In the following description, a processor for performing slicing steps and printing steps is discussed. The processor, not limiting, is a processor of the printer 1 or a processor of a computer.

As shown in FIG. 2, a 3D object is sent to the processor (step S10). In the embodiment, a 3D file generated by a user is sent to the processor via an embedded memory, the Internet, or a peripheral. A 3D object in the 3D file is read after opening the 3D file.

After reading the 3D object, the processor performs a 3D object processing on the 3D object (step S12) and a 2D imaging on the 3D object (step S14) respectively. In an embodiment, the processor may first perform the 3D object processing on the 3D object or the 2D imaging on the 3D object. In other embodiments, the processor may perform the 3D object processing on the 3D object and the 2D imaging on the 3D object simultaneously by multitasking.

The 3D object processing on the 3D object of the embodiment is first discussed below.

Regarding the 3D object processing on the 3D object, the processor performs object slicing on the 3D object to generate a plurality of records of object print route information of a plurality of printing layers (step S120). Specifically, the processor performs object slicing on the 3D object to generate a plurality of printing layers and a plurality of records of object print route information of the printing layers in which the number of the plurality of records of the object print route information is equal to the number of the printing layers. In other words, each printing layer of the 3D object corresponds to one of the object print route information. Each record of the object print route information stores an object contour of the corresponding printing layer. The printer 1 controls the 3D print head 12 based on the object contour and performs a filling printing based on a predetermined filling ratio to print a corresponding slicing object of the printing layer.

Consequently, the processor stores the plurality of records of the object print route information as a plurality of route files corresponding to the plurality of the printing layers (step S122). Specifically, the processor stores the route files in a memory of the printer 1 or the computer. In an embodiment, the processor stores the route files in a memory of a peripheral via a port. In another embodiment, the processor stores the route files in a Cloud database via the Internet.

The 2D imaging on the 3D object of the embodiment is discussed below.

Regarding the 2D imaging on the 3D object, the processor performs an image slicing on the 3D object to generate a plurality of records of color printing information of a plurality of printing layers (step S140). Specifically, the processor performs object slicing on the 3D object to generate a plurality of printing layers and a plurality of records of the color printing information of the printing layers in which the number of the plurality of records of the color printing information is equal to the number of the printing layers. In other words, each printing layer of the 3D object corresponds to one of the color printing information. Each record of the color printing information stores an original color contour of the corresponding printing layer.

In an embodiment, the plurality of printing layers generated by performing image slicing on the 3D object are equal to the plurality of printing layers generated by performing object slicing on the 3D object. In other words, each printing layer of the 3D object has one record of the object print route information and one record of the color printing information.

After step S140, the processor further performs an inward decrease on the plurality of records of the color printing information to generate a plurality of records of updated color printing information (step S142). In the embodiment, each record of the updated color printing information respectively stores an inwardly decreased coloring contour of the corresponding printing layer in which the inwardly decreased coloring contour is spaced from the original coloring contour by an inwardly decreased distance (e.g., the inwardly decreased distance D of FIG. 3B).

After step S142, the processor stores the plurality of records of the updated color printing information as a plurality of image files of the corresponding printing layers in the memory, the peripheral or the Cloud database (step S144).

In the embodiment, the processor stores the plurality of records of the object print route information as a plurality of route files, and stores the plurality of records of the updated color printing information as a plurality of image files. In a 3D printing, the printer 1 may directly read the route files and the image files. Further, the printer 1 can control the 3D print head 12 and the 2D print head 13 in the 3D printing based on the route files and the image files.

In another embodiment, the processor does not store the route files and the image files. Instead, after the 3D object processing on the 3D object and the 2D imaging on the 3D object, the processor temporarily stores the object print route information and the updated color printing information in the memory of the printer 1. In a 3D printing, the printer 1 may directly read the object print route information and the updated color printing information from the memory. Further, the printer 1 can control the 3D print head 12 and the 2D print head 13 in the 3D printing based on the object print route information and the updated color printing information. Therefore, the purpose of saving storage spaces can be achieved by not generating the route files and the image files.

For the sake of description, in the following embodiment the printer 1 printing a 3D object based on the route files and the image files is taken as an exemplary example. But this does not limit the scope of the invention.

Figures 3A, 3B:
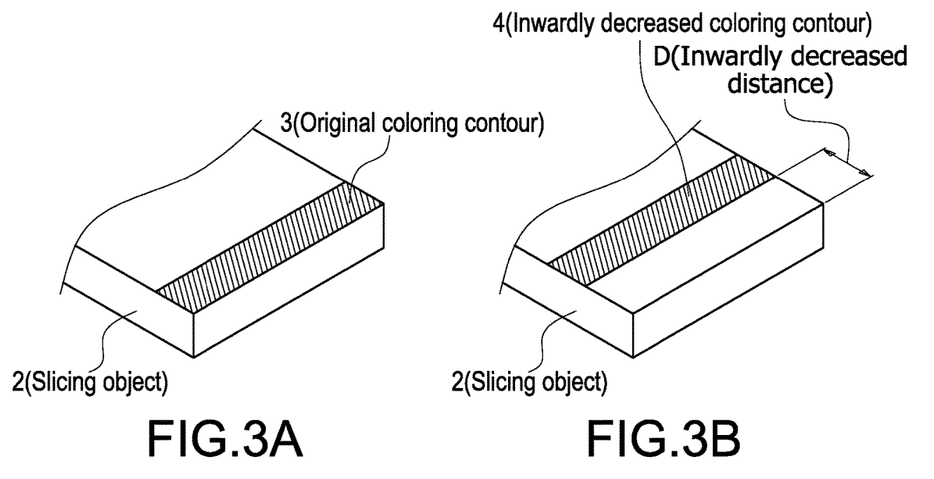
FIG. 3A is a perspective view of a coloring contour before inward decrease according to the invention.
FIG. 3B is a perspective view of a coloring contour after inward decrease according to the invention.

Referring to FIG. 3A, it is a perspective view of a coloring contour before inward decrease according to the invention, and referring to FIG. 3B, it is a perspective view of a coloring contour after inward decrease according to the invention. In a printing operation, the printer 1 prints a slicing object 2 of a corresponding printing layer based on the route file of the printing layer, and then colors the slicing object 2 based on the image file of the same printing layer.

As shown in FIG. 3A, the original coloring contour 3 generally aligns with the straight edge of the slicing object 2 (i.e., the object contour discussed above). Thus, after the printer 1 finishing the coloring, a user can see the color of the ink marked on the contour of the slicing object 2.

As discussed above, the 3D print head 12 of the printer 1 may adopt transparent thermoplastic filaments as materials. Thus, in the embodiment, the coloring, performed by the printer 1, is not required to align with the straight edge of the slicing object 2. Instead, the coloring contour may be inwardly decreased with respect to the slicing object 2.

In the step S142 of FIG. 2, the method involves inwardly decreasing on the plurality of records of the color printing information to generate the plurality of records of the updated color printing information. As shown in FIG. 3B, when the printer 1 prints based on the updated color printing information, an inwardly decreased coloring contour 4 is printed on the slicing object 2 in which the inwardly decreased coloring contour 4 is spaced from the original coloring contour 3 by an inwardly decreased distance D. Specifically, the inwardly decreased coloring contour 4 and the straight edge of the slicing object 2 are separated by the inwardly decreased distance D.

In the embodiment, the printer 1 replaces the original coloring contour 3 with the inwardly decreased coloring contour 4 and the inwardly decreased coloring contour 4 does not cover the contour (the straight edge) of the slicing object 2. By taking advantage of the transparency of the slicing object 2 (i.e., the transparent material adopted by the printer 1), after the printer 1 finishing coloring, a user still sees the color of the ink marked inside the slicing object 2.

The method of the disclosed example stores the plurality of records of the updated color printing information as the image files. Thus, in response to the printer 1 controlling the 2D print head 13 to perform coloring based on the image files, the ink does not mark on the contour of the finished color 3D model. This has the advantage of preventing the appearance of the color 3D model from being damaged after the contour being worn or being in contact with water.

Referring to FIG. 2 again, after steps S12 and S14, the processor finishes both the slicing of the 3D object and the inward decrease of the coloring contour of each printing layer of the 3D object. After steps S12 and S14, the printer 1 may start to print based on the route files and the image files.

In the printing, the printer 1 reads the route file and the image file of a printing layer (e.g., the first printing layer) of the 3D object from the memory, the peripheral or the Cloud database (step S16). Next, the printer 1 controls the 3D print head 12 to print the slicing object 2 of the corresponding printing layer based on the obtained route file (step S18).

After finishing printing of the slicing object 2, the printer 1 controls the 2D print head 13 to color the slicing object 2 based on the obtained image file (step S20). In the disclosed example, after finishing printing of the slicing object 2, the printer 1 colors the slicing object 2 based on the inwardly decreased coloring contour 4. Thus, droplets of the ink will not be propelled onto the contour (the straight edge) of the slicing object 2.

After finishing the printing and the coloring of the slicing object 2, the printer 1 determines whether a corresponding color 3D model of the 3D object has finished (step S22). That is, the printer 1 determines whether the printing layer being printed is the last printing layer of the 3D object to be printed.

If the printing and the coloring of the color 3D model has not finished (i.e., the printing layer being printed is not the last printing layer of the 3D object to be printed), the printer 1 may obtain the route file and the image file of a next printing layer (step S24) and next perform steps S18 and S20 sequentially to print and color the next printing layer of the 3D object until the printing and the coloring of the color 3D model are all finished.

Figure 4A:
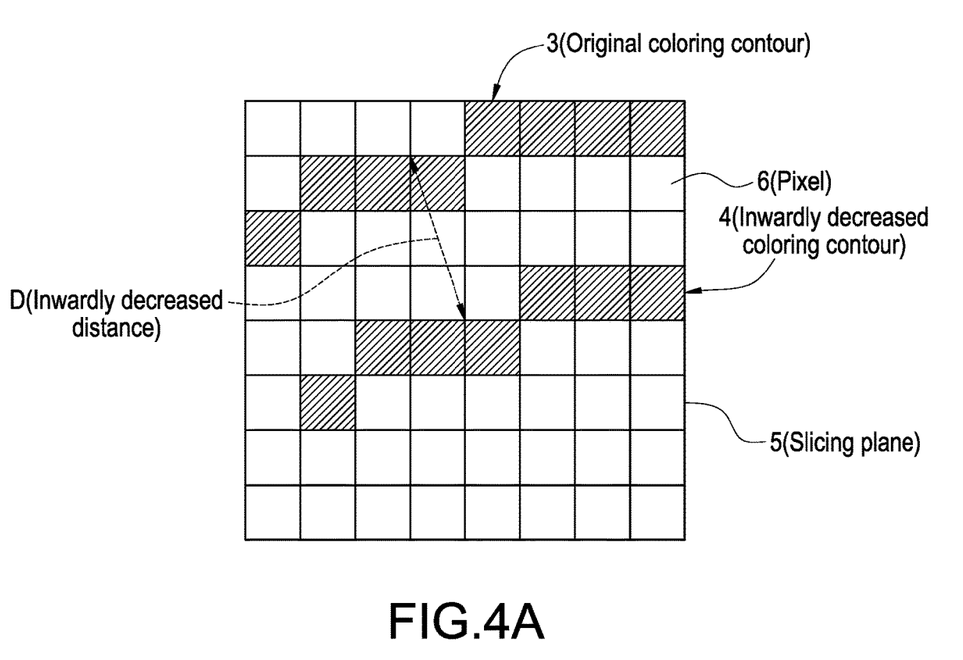
FIG. 4A schematically depicts the coloring contour after inward decrease according to an embodiment of the invention.
Figure 4B:
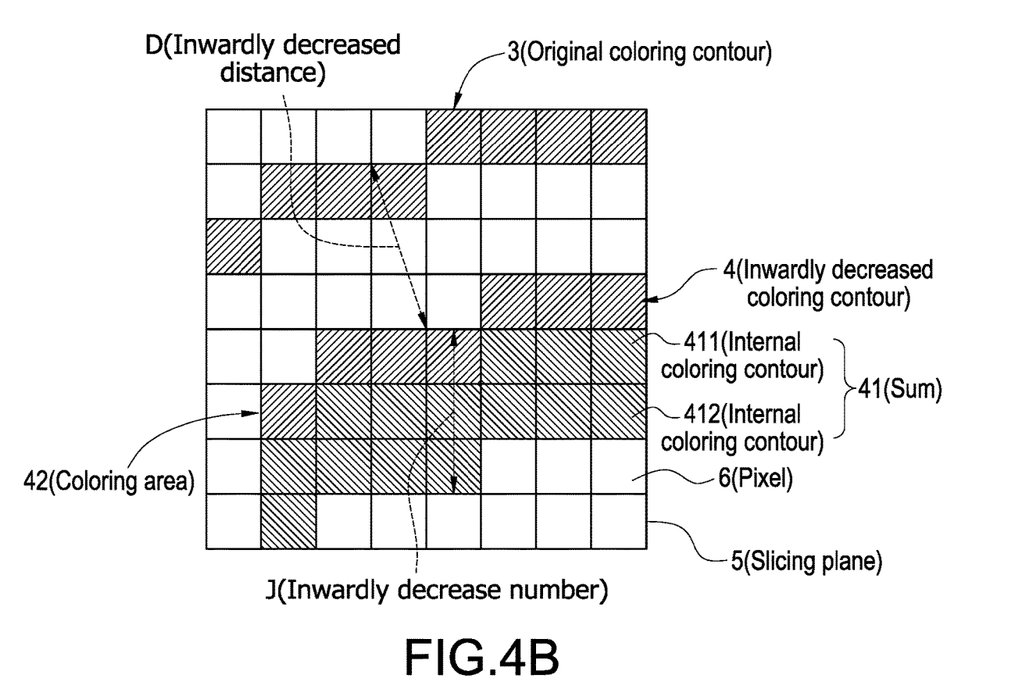
FIG. 4B schematically depicts a coloring range according to an embodiment of the invention.

Referring to FIG. 4A, it schematically depicts the coloring contour after inward decrease according to an embodiment of the invention, and referring to FIG. 4B, it schematically depicts a coloring range according to an embodiment of the invention respectively.

As described above, the color printing information describes the original coloring contour 3 of the printing layer, and the updated color printing information describes the inwardly decreased coloring contour 4 of the printing layer. In the embodiment of FIGS. 4A and 4B, a slicing plane 5 is taken as an example and the minimum size of the slicing plane 5 is a pixel 6 adopted by a 3D object. For example, if the resolution of the 3D object is 600 dpi (dot per inch), the pixel 6 will be a square having four equal sides of 0.042 mm (1/600 inch).

As shown in FIG. 4A, in an embodiment, the original coloring contour 3 is inwardly decreased a distance D to generate an inwardly decreased coloring contour 4. The original coloring contour 3 has the same contour and width as that of the inwardly decreased coloring contour 4. In an embodiment, the inwardly decreased distance D can be set as any value as long as the inwardly decreased coloring contour 4 does not cover the contour (straight edge) of the 3D object. Alternatively, the inwardly decreased distance D is generated by the processor in performing the 2D imaging on the 3D object.

In another embodiment, a plurality of inward decreases are performed on the original coloring contour 3 to generate a whole coloring area when the processor performs the 2D imaging on the 3D object.

Specifically, as shown in FIG. 4B, the processor may perform one time inward decrease on the original coloring contour 3 to generate an inwardly decreased coloring contour 4 based on the inwardly decreased distance D. Next, the processor performs one or more times inward decreases according to the inwardly decreased coloring contour 4 and a coloring width to generate one or more internal coloring contours 411 and 412 in which the number of the internal coloring contours 411 and 412 is related to an inward decrease number J performed by the processor. Specifically, the number of the internal coloring contours 411 and 412 is equal to J−1.

In an embodiment, the coloring width is equal to an ink propelling width of the 2D print head 13 of the printer 1. In an embodiment, in coloring, the printer 1 controls the 2D print head 13 to propel droplets of the color ink based on the ink propelling width. Thus, coloring widths of all of the original coloring contour 3, the inwardly decreased coloring contour 4, and the internal coloring contours 411 and 412 are equal to the ink propelling width. In another embodiment, the coloring width is equal to the length of the size of the pixel 6 employed by the 3D object.

In the embodiment shown in FIG. 4B, the inward decrease number J is three, and the sum of the number of the inwardly decreased coloring contours 4 and the number of the one or more internal coloring contours 411 and 412 is equal to the inward decrease number J. Specifically, in the embodiment shown in FIG. 4B, the processor performs a first inward decrease to generate an inwardly decreased coloring contour 4 based on the original coloring contour 3 and the inwardly decreased distance D. Next, the processor performs a second inward decrease to generate a first internal coloring contour 411 based on the inwardly decreased coloring contour 4 and the coloring width. Finally, the processor performs a third inward decrease to generate a second internal coloring contour 412 based on the first internal coloring contour 411 and the coloring width. All internal coloring contours comprise the first internal coloring contour 411 and the second internal coloring contour 412 and are taken as a sum 41 of internal coloring contours. In the embodiment, a coloring area 42 is comprised of the inwardly decreased coloring contour 4 and the one or more internal coloring contours 411 and 412. In printing, the printer 1 may perform coloring on the whole coloring area 42.

Specifically, the inward decrease number J is inversely proportional to the transmittance of the transparent material of the 3D print head 12. If the 3D print head 12 is using opaque materials, the inward decrease number J should be increased for making the finished 3D model darker and more significant. To the contrary, the inward decrease number J should be decreased if the 3D print head 12 is using transparent or translucent materials.

Figure 5:
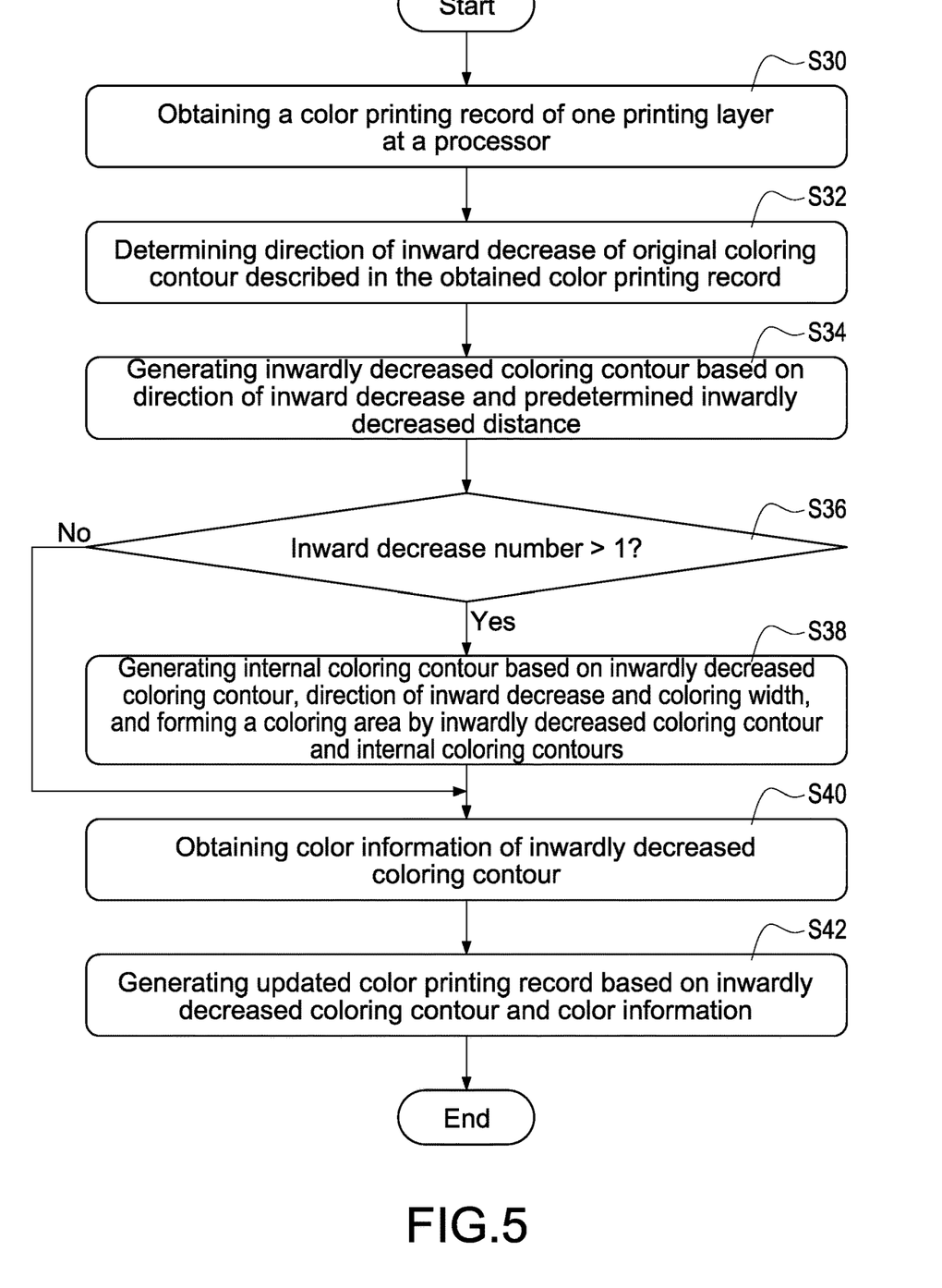
FIG. 5 is a flow chart illustrating a method of inwardly decreasing coloring contour of color 3D object according to the invention.

Referring to FIG. 5, it is a flow chart illustrating a method of inwardly decreasing coloring contour of color 3D object according to the invention. The flow chart of FIG. 5 further discusses the inward decrease performed by the step S14 of FIG. 2. For the sake of description, in the following paragraphs a single record of color printing information for inward decrease is described.

First, after performing an image slicing, the processor obtains a record of color printing information of a printing layer (step S30). Next, the processor determines a direction of inward decrease of the original coloring contour 3 described in the color printing information (step S32). The processor thus can generate an inwardly decreased coloring contour 4 corresponding to the original coloring contour 3 based on the direction of inward decrease of the original coloring contour 3 and the predetermined inwardly decreased distance D (step S34). As described above, the predetermined inwardly decreased distance D can be set by the user. Alternatively, the predetermined inwardly decreased direction D is generated by the processor in performing the 2D imaging on the 3D object.

Next, the processor determines whether the inward decrease number J of the color printing information is greater than one or not (step S36). If the inward decrease number J is not greater than one, the processor may obtain color information of the inwardly decreased coloring contour 4 after generating the inwardly decreased coloring contour 4, (step S40), and then generates a record of updated color printing information based on the inwardly decreased coloring contour 4 and the color information (step S42). In other words, if the inward decrease number J is one, the printer 1 may perform coloring on an area equal to an area covered by the inwardly decreased coloring contour 4.

If the inward decrease number J is greater than one, the processor may further generate one or more internal coloring contours 411 and 412 based on the inwardly decreased coloring contour 4, the direction of inward decrease, and a coloring width after generating the inwardly decreased coloring contour 4, and then generates a coloring area 42 which is comprised of the inwardly decreased coloring contour 4 and all of the internal coloring contours 411 and 412 (step S38).

In the embodiment, the sum of the inwardly decreased coloring contour 4 and the internal coloring contours 411 and 412 is equal to the inward decrease number J. For example, if the inward decrease number J is two, the processor may generate an inwardly decreased coloring contour 4 and an internal coloring contour 411; if the inward decrease number J is three, the processor may generate an inwardly decreased coloring contour 4 and two internal coloring contours 411 and 412 (as shown in FIG. 4B, there is a first internal coloring contour 411 and a second internal coloring contour 412); and so on.

If the inward decrease number J is greater than one, the processor may perform the step S40 to obtain color information for the coloring area 42 and perform the step S42 to generate updated color printing information based on the coloring area 42 and the color information. In other words, if the inward decrease number J is greater than one, the printer 1 may perform coloring on an area equal to an area covered by the coloring area 42.

It is noted that in an embodiment the step S40 involves directly copying the color of the original coloring contour 3 as color information of the inwardly decreased coloring contour 4. In another embodiment, if the inward decrease number J is greater than one, the step S40 involves further copying the color of the inwardly decreased coloring contour 4 as color information of the whole coloring area 42 (as discussed in detail later).

In the modeling of a 3D object, the processor converts the contour of the 3D object into an assembly of a plurality of triangles. Thus, in the step S32 the processor may determine the direction of inward decrease based on the triangles of the 3D object. In the step S40 the processor may determine the color information based on the colors of the triangles of the 3D object (as discussed in detail later).

Figure 6:
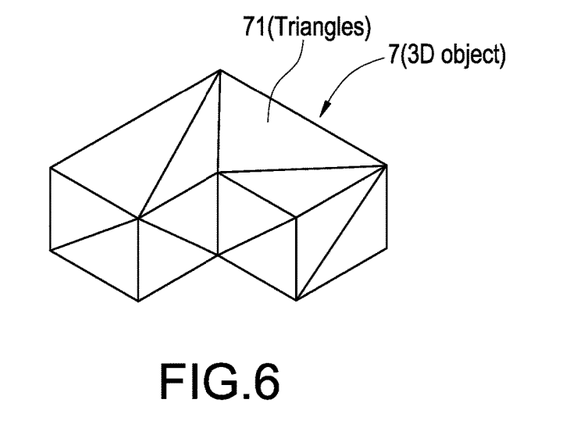
FIG. 6 is a perspective view of a 3D object.

Referring to FIG. 6, it is a perspective view of a 3D object. In the embodiment of FIG. 6, it shows a 3D object 7. As shown in FIG. 6, with respect to the processor, the contour of the 3D object 7 is comprised of a plurality of triangles 71. The above triangles 71 are conventional technologies related to 3D drawing and 3D printing and thus its detailed description is omitted herein for the sake of brevity.

Figure 7:
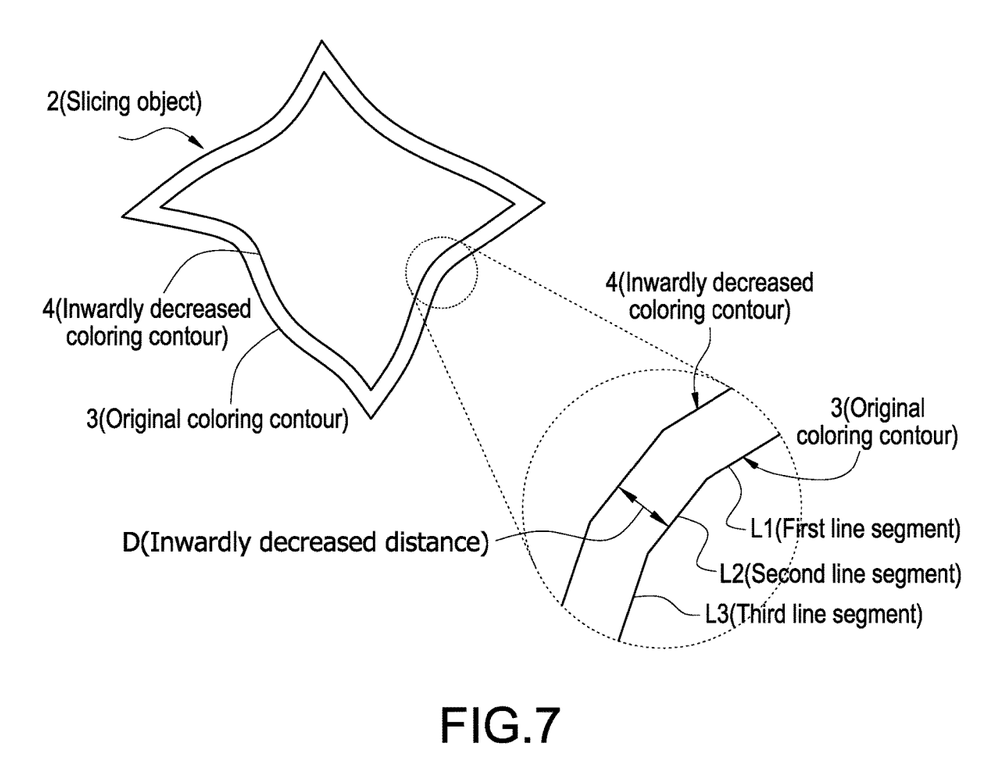
FIG. 7 is a perspective view of the coloring contour according to an embodiment of the invention with a portion being greatly enlarged.

Referring to FIG. 7, it is a perspective view of the coloring contour according to an embodiment of the invention with a portion being greatly enlarged. As described above, the color printing information describes the original coloring contour 3 of the printing layer thereof, and the updated color printing information describes the inwardly decreased coloring contour 4 of the printing layer thereof. When the printer 1 colors the printing layer based on the image file (i.e., the updated color printing information), droplets of ink are propelled onto the inwardly decreased coloring contour 4. If the inward decrease number J is greater than one, the printer 1 propels droplets of ink onto the coloring area 42.

Further, as shown in FIG. 7, the original coloring contour 3 is greatly enlarged. It can be seen that a curve of the original coloring contour 3 of the 3D object is comprised of a plurality of line segments. In the embodiment shown in FIG. 7, a first line segment L1, a second line segment L2, and a third line segment L3 are shown. In an embodiment, when generating the inwardly decreased coloring contour 4 of a corresponding curve, the processor respectively performs an inwardly decrease on each of the line segments L1, L2 and L3 of the curve. That is, while the line segments L1, L2 and L3 are on a curve of the original coloring contour 3, they belong to three different triangles.

Figure 8:
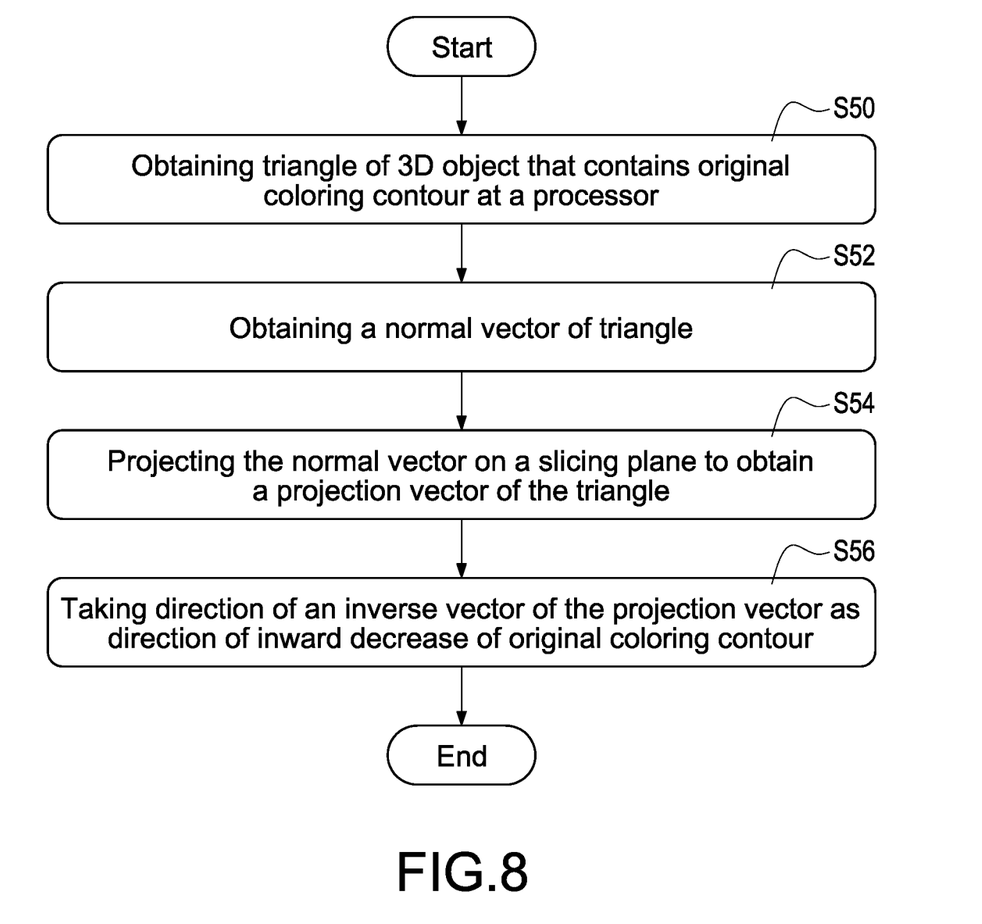
FIG. 8 is a flow chart illustrating steps of determining the direction of inward decrease according to an embodiment of the invention.
Figure 9:
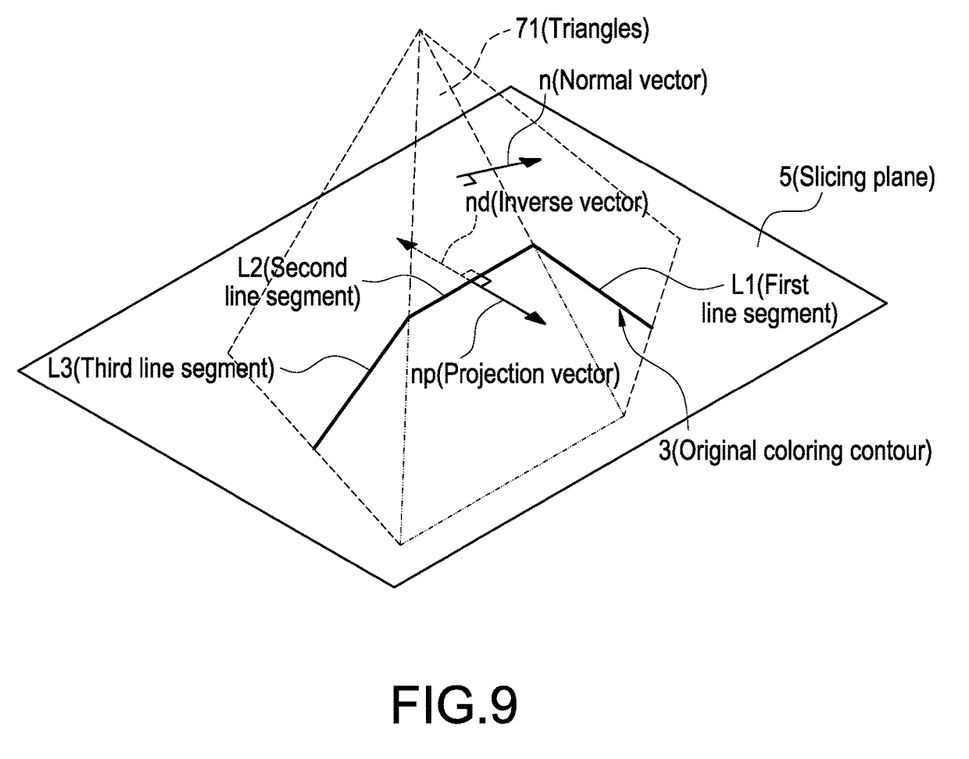
FIG. 9 schematically depicts the determination of the direction of inward decrease according to the embodiment of the invention.

Referring to FIG. 8, it is a flow chart illustrating steps of determining the direction of inward decrease according to an embodiment of the invention, and referring to FIG. 9, it schematically depicts the determination of the direction of inward decrease according to the embodiment of the invention. When determining the direction of inward decrease of the original coloring contour 3 of one printing layer (for example, performing the step S50 of FIG. 5), the processor obtains the triangle 71 of the 3D object that contains the original coloring contour 3 (step S50). That is, it is determined that in the 3D object, the original coloring contour 3 is contained by and defined by which triangle. In the embodiment of FIG. 9, the second line segment L2 of the original coloring contour 3 and the triangle 71 containing the line segment L2 are taken as an example, but not limited to this.

Next, the processor obtains a normal vector n of the triangle 71 (step S52). In the embodiment of FIG. 9, the normal vector n is represented by (nx, ny, nz). Next, the processor projects the normal vector n on a slicing plane 5 to obtain a projection vector $n_p$ of the triangle 71 (step S54). In the embodiment of FIG. 9, the projection vector $n_p$ is obtained by projecting the normal vector n on an X-Y plane. Thus its component along z-axis is zero and the projection vector $n_p$ is represented by (nx, ny, 0). In other words, the component along z-axis of the normal vector n is set as zero by the processor in order to obtain a projection vector $n_p$ having the component along z-axis being zero.

After the step S54, the processor takes the direction of an inverse vector $n_d$ of the projection vector $n_p$ as a direction of inward decrease of the original coloring contour 3 (e.g., the second line segment L2 as an example) (step S56). In other words, the direction of inward decrease is perpendicular to the original coloring contour 3 and is opposite to the direction of the projection vector $n_p$ of the original coloring contour 3.

It is noted that the 3D object is comprised of multiple slicing objects of the multiple printing layers. Steps S50 to S56 are performed on the original coloring contour 3 of each slicing object in order to determine the direction of inward decrease of the each original coloring contour 3. Further, the original coloring contour 3 of any printing layer is comprised of a plurality of line segments (i.e., belonging to different triangles) and thus different line segments may have different directions of inward decreases.

Figure 10:
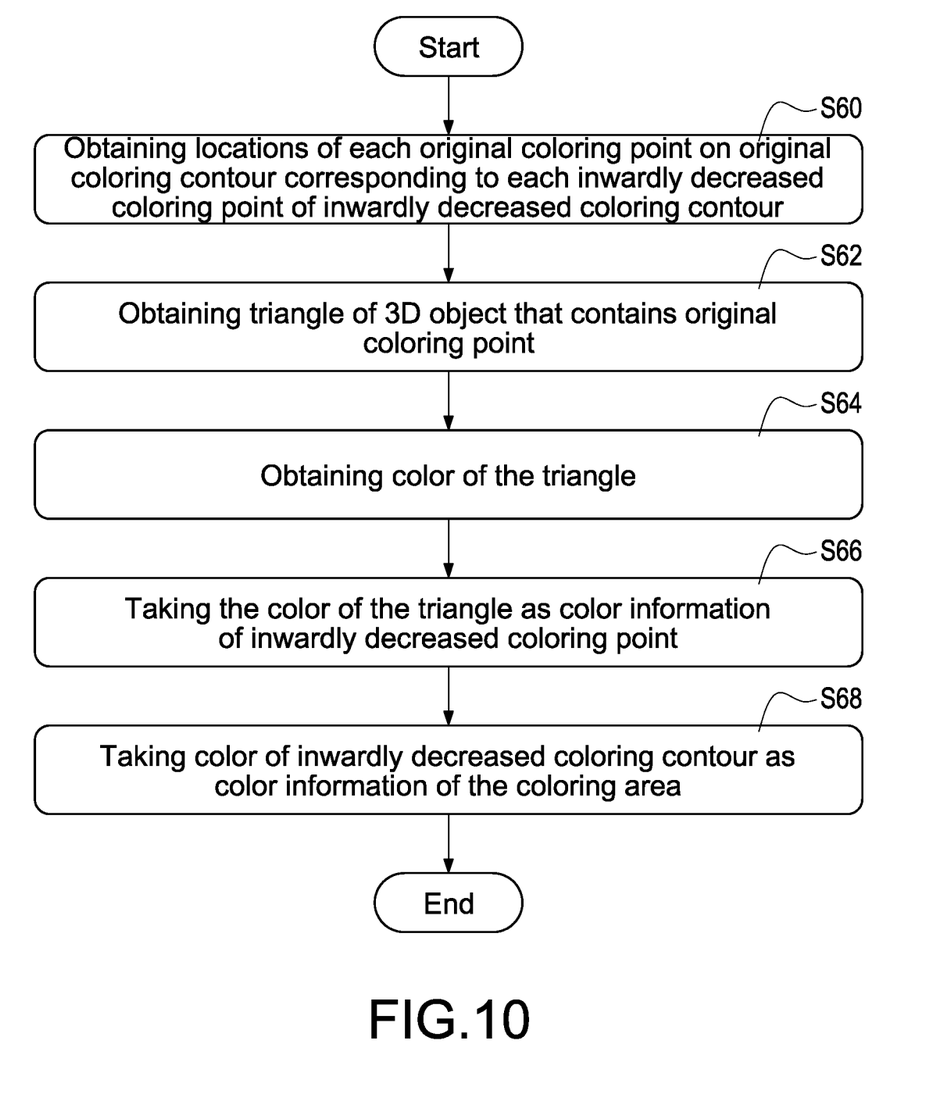
FIG. 10 is a flow chart illustrating steps of determining the color according to an embodiment of the invention.
Figure 11:
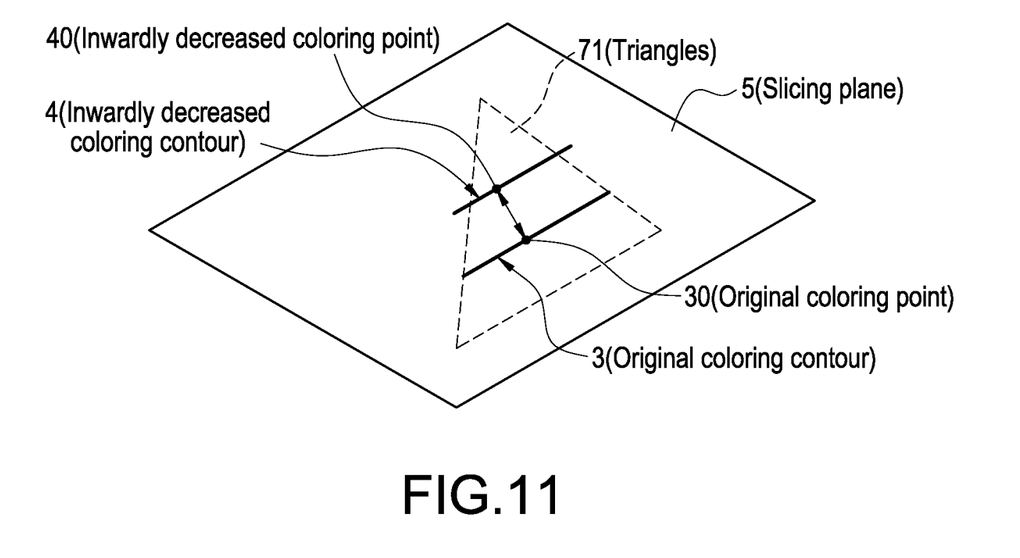
FIG. 11 schematically depicts the color determination according to the embodiment of the invention.

Referring to FIG. 10, it is a flow chart illustrating steps of determining the color according to an embodiment of the invention, and referring to FIG. 11, it schematically depicts the color determination according to the embodiment of the invention. When determining the color information to be used by the inwardly decreased coloring contour 4 (for example, performing the step S40 of FIG. 5), the processor obtains locations of each original coloring point on each original coloring contour 3 corresponding to each inwardly decreased coloring point of the inwardly decreased coloring contour 4 (step S60). For example, as shown in FIG. 11, when the processor determines the color information to be used by an inwardly decreased coloring point 40 of the inwardly decreased coloring contour 4, it obtains the location of an original coloring point 30 on the original coloring contour 3 that is corresponding to the inwardly decreased coloring point 40.

Next, the processor obtains the triangle 71 of the 3D object that contains the original coloring point 30 (step S62). Next, the processor obtains the color of the triangle 71 (step S64). In the embodiment, the color of the inwardly decreased coloring point 40 is the same as that of the original coloring point 30. Thus, the color of each original coloring point 30 is decided by the color of the triangle 71. After the step S64, the processor takes the color of the triangle 71 as the color information of the inwardly decreased coloring point 40 (step S66).

If the inward decrease number J is greater than one, it means that the processor may generate one or more internal coloring contours 411 and 412. Specifically, the number of the internal coloring contours 41 is the inward decrease number J minus one. The coloring area 42 is comprised of the inwardly decreased coloring contour 4 and all of the internal coloring contours 411 and 412. In the embodiment, when there is the coloring area 42, the processor may take the color of the inwardly decreased coloring contour 4 as color information of the coloring area 42 (step S68).

By taking advantages of the methods disclosed by the embodiments of the Invention, it is possible to effectively move the position of propelling droplets of color ink from the contour of the slicing objects to an inward position of the slicing objects. Therefore, it can eliminate drawbacks including ink jetted on the contour of the color 3D model being damaged if the contour of the color 3D model is worn or contacts water, and the appearance of the colored 3D model being seriously affected associated with the conventional 3D printing technologies.

While the invention has been described in terms of preferred embodiments, those skilled in the art will recognize that the invention can be practiced with modifications within the spirit and scope of the appended claims.

What is claimed is:

1. A method of inwardly decreasing coloring contour of color 3D object, comprising the steps of:
   (a) sending a 3D object to a processor;
   (b) performing an object slicing on the 3D object to generate a plurality of records of object print route information of a plurality of printing layers;
   (c) performing an image slicing on the 3D object to generate a plurality of records of color printing information of the printing layers wherein each record of the color printing information respectively involves an original coloring contour of each printing layer, wherein the original coloring contour aligns with an edge of a slicing object;
   (d) performing an inward decrease on the plurality of records of the color printing information to generate a plurality of records of updated color printing information wherein each record of the updated color printing information involves an inwardly decreased coloring contour of each printing layer, and the inwardly decreased coloring contour is formed by spacing from the corresponding original coloring contour toward an inner direction of inward decrease by an inwardly decreased distance; and
   (e) causing a storage to store the records of the object print route information as a plurality of route files, and storing the records of the updated color printing information as a plurality of image files.

2. The method as claimed in claim 1, wherein step (d) comprises the steps of:
- (d1) obtaining one of the plurality of records of the color printing information;
- (d2) determining the inner direction of inward decrease of the original coloring contour described in the color printing information;
- (d3) generating the inwardly decreased coloring contour based on the original coloring contour, the inner direction of inward decrease, and the inwardly decreased distance;
- (d4) obtaining color information of the inwardly decreased coloring contour; and
- (d5) generating the updated color printing information based on the inwardly decreased coloring contour and the color information.

3. The method as claimed in claim 2, wherein step (d) further comprises the steps of:
- (d6) determining whether an inward decrease number (J) is greater than one or not;
- (d7) performing steps (d4) and (d5) if the inward decrease number (J) is not greater than one;
- (d8) generating one or more internal coloring contours based on the inwardly decreased coloring contour, the inner direction of inward decrease, and a coloring width if the inward decrease number (J) is greater than one, wherein a coloring area is comprised of the inwardly decreased coloring contour and the one or more internal coloring contours, and a sum of the inwardly decreased coloring contour and the one or more internal coloring contours is equal to the inward decrease number (J);
- (d9) obtaining color information of the coloring area; and
- (d10) generating the updated color printing information based on the coloring area and the color information.

4. The method as claimed in claim 3, wherein the coloring width is equal to an ink propelling width of a 2D print head of a 3D printer.

5. The method as claimed in claim 3, wherein the coloring width is equal to the size of a pixel adopted by the 3D object.

6. The method as claimed in claim 1, wherein the route files and the image files are configured to be used by a 3D printer having a 3D print head, and the 3D print head performs 3D printing via light transmissive materials.

7. The method as claimed in claim 6, wherein the 3D print head performs 3D printing via transparent or translucent materials.

8. The method as claimed in claim 2, wherein step (d2) comprises the steps of:
- (d21) obtaining a triangle of the 3D object that contains the original coloring contour;
- (d22) obtaining a normal vector (n) of the triangle;
- (d23) projecting the normal vector (n) on a slicing plane to obtain a projection vector ($n_p$) of the triangle; and
- (d24) taking a direction of an inverse vector ($n_d$) of the projection vector ($n_p$) as the inner direction of inward decrease of the original coloring contour.

9. The method as claimed in claim 8, wherein a component of the projection vector ($n_p$) along z-axis is zero.

10. The method as claimed in claim 3, wherein step (d4) involves copying color of the original coloring contour as color information of the inwardly decreased coloring contour, and step (d9) involves copying color of the inwardly decreased coloring contour as color information of the coloring area.

11. The method as claimed in claim 2, wherein step (d4) comprises the steps of:
- (d41) obtaining locations of each original coloring point on the original coloring contour corresponding to each inwardly decreased coloring point of the inwardly decreased coloring contour;
- (d42) obtaining a triangle of the 3D object that contains the original coloring points;
- (d43) obtaining color of the triangle; and
- (d44) setting the color of the triangle as color information of each of the inwardly decreased coloring point of the inwardly decreased coloring contour.

12. The method as claimed in claim 3, wherein step (d4) comprises the steps of:
- (d41) obtaining locations of each original coloring point on the original coloring contour corresponding to each inwardly decreased coloring point of the inwardly decreased coloring contour;
- (d42) obtaining a triangle of the 3D object that contains the original coloring points;
- (d43) obtaining color of the triangle; and
- (d44) setting the color of the triangle as color information of each of the inwardly decreased coloring point of the inwardly decreased coloring contour;
- wherein step (d9) involves copying color of the inwardly decreased coloring contour as color information of the coloring area.

13. The method as claimed in claim 1, further comprising the steps of:
- (f) obtaining the route file and the image file of one of the printing layers of the 3D object;
- (g) causing a 3D printer to controls a 3D print head to print a slicing object of the corresponding printing layer based on the obtained route file;
- (h) causing the 3D printer to control a 2D print head to color the slicing object based on the obtained image file;
- (i) causing the 3D printer to determine whether the printing layer being printed is a last printing layer of the 3D object;
- (j) causing the 3D printer to obtain the route file and the image file of a next printing layer and again performing step (g) to step (i) if the printing layer being printed is not the last printing layer of the 3D object; and
- (k) finishing a printing action of the 3D printer if the printing layer being printed is the last printing layer of the 3D object.

14. The method as claimed in claim 13, wherein the 3D printer is a fused deposition model (FDM) 3D printer.

15. The method as claimed in claim 3, wherein the route files and the image files are configured to be used by a 3D printer having a 3D print head, and the 3D print head performs the printing action via light transmissive materials, and the inward decrease number (J) is inversely proportional to transmittance of the light transmissive materials.

16. The method as claimed in claim 1, wherein the route files and the image files are configured to be used by a 3D printer having a 3D print head and a 2D print head, wherein in a 3D printing action, the 3D printer controls the 3D print head to print the slicing object of a corresponding printing layer based on the route file of the printing layer and then controls the 2D print head to color the slicing object based on the image file of the same printing layer, wherein the 3D printer controls the 2D print head to perform coloring according to the inwardly decreased coloring contours of each record of the updated color printing information, and the positions of the original coloring contours in each record of the color printing information are neglected of coloring.

* * * * *